US011488060B2

(12) United States Patent
Harada et al.

(10) Patent No.: US 11,488,060 B2
(45) Date of Patent: Nov. 1, 2022

(54) LEARNING METHOD, LEARNING PROGRAM, LEARNING DEVICE, AND LEARNING SYSTEM

(71) Applicant: The University of Tokyo, Tokyo (JP)

(72) Inventors: Tatsuya Harada, Tokyo (JP); Yuji Tokozume, Tokyo (JP)

(73) Assignee: The University of Tokyo, Tokyo (JP)

( * ) Notice: Subject to any disclaimer, the term of this patent is extended or adjusted under 35 U.S.C. 154(b) by 530 days.

(21) Appl. No.: 16/633,803

(22) PCT Filed: Jul. 25, 2018

(86) PCT No.: PCT/JP2018/027895
§ 371 (c)(1),
(2) Date: Jan. 24, 2020

(87) PCT Pub. No.: WO2019/022136
PCT Pub. Date: Jan. 31, 2019

(65) Prior Publication Data
US 2020/0210893 A1    Jul. 2, 2020

(30) Foreign Application Priority Data

Jul. 25, 2017    (JP) .............................. JP2017-144029

(51) Int. Cl.
*G06N 20/00*    (2019.01)
*G06K 9/62*    (2022.01)
(Continued)

(52) U.S. Cl.
CPC ........... *G06N 20/00* (2019.01); *G06K 9/6267* (2013.01); *G06N 3/0454* (2013.01); *G06N 3/084* (2013.01); *G06V 10/82* (2022.01)

(58) Field of Classification Search
CPC ...... G06N 20/00; G06N 3/0454; G06N 3/084; G06N 7/005; G06K 9/6267; G06K 9/6255;
(Continued)

(56) References Cited

U.S. PATENT DOCUMENTS 10,839,269 B1* 11/2020 Al-Turki ............... G06K 9/6263
10,949,889 B2* 3/2021 Lyons ................ G06Q 30/0269
(Continued)

FOREIGN PATENT DOCUMENTS

JP     2017-084320         5/2017

OTHER PUBLICATIONS

Fu et al., "Music classification via the bag-of-features approach," Pattern Recognition Letters, Oct. 15, 2011, 32(14):1768-77.
(Continued)

*Primary Examiner* — Lewis G West
(74) *Attorney, Agent, or Firm* — Fish & Richardson P.C.

(57) ABSTRACT

Provided is a learning method, a learning program, a learning device, and a learning system, for training a classification model, to further raise the correct answer rate of classification by the classification model. The learning method includes execution of generating one piece of composite data by compositing a plurality of pieces of training data of which classification has each been set, or a plurality of pieces of converted data obtained by converting the plurality of pieces of training data, at a predetermined ratio, inputting one or a plurality of pieces of the composite data into the classification model, and updating a parameter of the classification model so that classification of the plurality of pieces of training data included in the composite data is replicated at the predetermined ratio by output of the classification model, by a computer provided with at least one hardware processor and at least one memory.

14 Claims, 10 Drawing Sheets

(51) Int. Cl.
*G06V 10/82* (2022.01)
*G06N 3/08* (2006.01)
*G06N 3/04* (2006.01)

(58) Field of Classification Search
CPC ...... G06K 9/6256; G06V 10/82; G10L 17/26; G10L 25/30
See application file for complete search history.

(56) References Cited

U.S. PATENT DOCUMENTS

| | | | |
|---|---|---|---|
| 2016/0012333 A1* | 1/2016 | Takahashi | G06N 5/02 706/12 |
| 2016/0260014 A1 | 9/2016 | Hagawa | |
| 2017/0091637 A1* | 3/2017 | Chae | G06N 20/10 |
| 2017/0147909 A1* | 5/2017 | Izumi | G06V 10/776 |
| 2017/0358045 A1* | 12/2017 | Takeda | G06Q 50/18 |
| 2021/0158137 A1* | 5/2021 | Sasao | G06F 7/24 |
| 2022/0189002 A1* | 6/2022 | Kim | G06K 9/6257 |

OTHER PUBLICATIONS

Piczak, "Environmental sound classification with convolutional neural networks," IEEE 25th International Workshop on Machine Learning for Signal Processing (MLSP), Boston, MA, Sep. 17-20, 2015, IEEE, 1-6.
Rasiwasia et al., "Holistic context models for visual recognition," IEEE Transactions on Pattern Analysis and Machine Intelligence, Mar. 22, 2012, 34(5):902-17.

\* cited by examiner

FIG.6

| TYPE OF CLASSIFICATION MODEL | CORRECT ANSWER RATE IN CASE OF LEARNING BY CONVENTIONAL METHOD | CORRECT ANSWER RATE IN CASE OF LEARNING BY METHOD ACCORDING TO PRESENT APPLICATION |
|---|---|---|
| 1 | 68.3% | 74.3% |
| 2 | 71.7% | 80.7% |

LEARNING METHOD, LEARNING PROGRAM, LEARNING DEVICE, AND LEARNING SYSTEM

TECHNICAL FIELD

The present invention relates to a learning method, a learning program, a learning device, and a learning system.

BACKGROUND ART

In recent years, there have been advances in research where image recognition, audio recognition, and natural language processing is performed using models such as multilayer neural networks and so forth. For example, there is known a classification model that takes an image as input, and outputs a classification result of whether the image is an image of a dog or an image of a cat, and so forth. A classification model may be trained by using a plurality of pieces of training data regarding which classification has set as input, and updating parameters of the classification model so that correct classification is replicated.

As an example of a learning method of a neural network, Patent Document 1 below describes a learning method of a classifier for classifying an image. The learning method includes a first step in which a coarse class classifier configured of a first neural network is made to classify a plurality of images each attached with a label indicating a detailed class into a plurality of coarse classes encompassing a plurality of detailed classes and is made to learn a first feature that is a feature common in each of the plurality of coarse classes, and a second step in which a detailed class classifier, which is configured of a second neural network that differs in comparison with the first neural network only regarding a final layer, is made to classify the plurality of images into detailed classes and is made to learn a second feature that is a feature common in each of the detailed classes.

CITATION LIST

Patent Document

Patent Document 1: Patent Publication JP-A-2017-84320

SUMMARY

Technical Problem

When learning by the classification model is performed so that a plurality of pieces of training data are correctly classified, the degree of accuracy of classification by that classification model regarding that training data is secured. However, in a case data that should belong to the same classification is input to the classification model, there are cases where how much diversion there will be in the output of the classification model in a feature space is not necessarily clear.

In a case where data that should belong to the same classification is input to the classification model, and in a case where there is diversion in the output of the classification model in a feature space, i.e., in a case where precision of output is low, there will be more classification errors when new data is input to the classification model. In contrast with this, in a case where data that should belong to the same classification is input to the classification model, and in a case where there is no diversion in the output of the classification model in a feature space, i.e., in a case where precision of output is high, there will be less classification errors when new data is input to the classification model.

Also, a great amount of training data may be necessary to train a complicated classification model with a great number of parameters such as represented by so-called deep learning, so that the output is highly precise. However, preparation of a great amount of training data may not be possible, and consequently, a situation may occur where the precision of the output of the classification model is not sufficiently raised and the correct answer rate of classification is not sufficiently raised.

Accordingly, the present invention provides a learning method, a learning program, a learning device, and a learning system, for training a classification model, to further raise the correct answer rate of classification by the classification model.

Solution to Problem

A learning method according to an aspect of the present invention includes execution of generating one piece of composite data by compositing a plurality of pieces of training data of which classification has each been set, or a plurality of pieces of converted data obtained by converting the plurality of pieces of training data, at a predetermined ratio, inputting one or a plurality of pieces of the composite data into a classification model, and updating a parameter of the classification model so that classification of the plurality of pieces of training data included in the composite data is replicated at the predetermined ratio by output of the classification model, by a computer provided with at least one hardware processor and at least one memory.

According to this aspect, by training the classification model to replicate the ratio of classification of the plurality of pieces of training data included in composite data, the classification model can be trained so as to further raise the correct answer rate of classification by the classification model in comparison with a case of training the classification model so as to replicate classification of individual pieces of training data.

In the above aspect, determining the predetermined ratio before executing generating of the composite data may be further included.

According to this aspect, making the ratio of compositing the training data variable enables composite data of different content to be generated even in a case of using the same training data, and diversity of data used for learning by the classification model can be increased.

In the above aspect, determining the predetermined ratio may include randomly selecting one numeric value from a predetermined numeric value range, and determining the predetermined ratio on the basis of the selected numeric value.

According to this aspect, by randomly selecting the ratio for compositing training data, diverse composite data can be generated even in a case where the count of training data is limited, and the classification model can be trained so as to further raise the correct answer rate of classification by the classification model.

In the above aspect, determining the predetermined ratio may be performed each time generating of the composite data is executed.

According to this aspect, by executing determining of the ratio for compositing training data each time generating of the composite data is executed, learning can be performed regarding composite data of different content each time iteration is performed, even in a case where the iteration count of learning is great, and the classification model can be trained by diverse data.

In the above aspect, selecting the plurality of pieces of training data from an initial dataset before executing generating of the composite data may be further included.

According to this aspect, by selecting the plurality of pieces of training data from the initial dataset and using as composite data enables the count of pieces of data serving as the source for compositing the composite data to be increased by a count equivalent to the number of combinations of the initial dataset, and the classification model can be trained with diverse data.

In the above aspect, selecting the plurality of pieces of training data may include randomly selecting data from the initial dataset.

According to this aspect, by randomly selecting the plurality of pieces of training data from the initial dataset, diverse composite data can be generated even in a case where the count of training data is limited, and the classification model can be trained so as to further raise the correct answer rate of classification by the classification model.

In the above aspect, generating the plurality of pieces of converted data by converting the plurality of pieces of training data before executing generating of the composite data may be further included.

According to this aspect, by obtaining a plurality of pieces of converted data by formatting the plurality of pieces of training data, performing data augmentation of the plurality of pieces of training data, and so forth, and generating composite data by compositing these at a predetermined ratio, the classification model can be trained by even more diverse data.

In the above aspect, the plurality of pieces of training data may be a plurality of pieces of sound data, and generating the composite data may include generating one piece of composite sound data by overlaying the plurality of pieces of sound data at the predetermined ratio.

According to this aspect, training the classification model so as to replicate the ratio of classification of the plurality of pieces of sound data that have been overlaid enables the classification model to be trained so as to further raise the correct answer rate of classification by the classification model as compared to a case of training the classification model so as to replicate classification of individual pieces of sound data.

In the above aspect, the plurality of pieces of training data may be a plurality of pieces of image data, and generating the composite data may include generating one piece of composite image data by adding pixel values at the predetermined ratio, for each pixel of the plurality of pieces of image data.

According to this aspect, training the classification model to replicate the ratio of classification of the plurality of pieces of image data that have been overlaid enables the classification model to be trained so as to further raise the correct answer rate of classification by the classification model as compared to a case of training the classification model so as to replicate classification of individual pieces of image data.

In the above aspect, the plurality of pieces of training data may be a plurality of pieces of text data, and generating the composite data may include converting the plurality of pieces of text data into a plurality of pieces of vector data, and generating one piece of composite vector data by adding the plurality of pieces of vector data at the predetermined ratio.

According to this aspect, training the classification model to replicate the ratio of classification of the plurality of pieces of text data that have been overlaid enables the classification model to be trained so as to further raise the correct answer rate of classification by the classification model as compared to a case of training the classification model so as to replicate classification of individual pieces of text data.

A learning method according to another aspect of the present invention includes execution of inputting a plurality of pieces of training data of which classification has each been set, or a plurality of pieces of converted data obtained by converting the plurality of pieces of training data, into a classification model, and obtaining a plurality of intermediate outputs of the classification model, generating one piece of composite data by compositing the plurality of intermediate outputs at a predetermined ratio, inputting one or a plurality of pieces of the composite data into a subsequent stage of the configuration of the classification model that has output the intermediate outputs, and updating a parameter of the classification model so that classification of the plurality of pieces of training data included in the composite data is replicated at the predetermined ratio by output of the classification model, by a computer provided with at least one hardware processor and at least one memory.

According to this aspect, by obtaining intermediate outputs of the classification model, generating composite data by compositing thereof at a predetermined ratio, inputting the composite data into a subsequent stage of the configuration of the classification model that has output the intermediate outputs, and training the classification model so as to replicate the ratio of classification of the plurality of pieces of training data included in the composite data, the classification model can be trained so as to further raise the correct answer rate of classification by the classification model as compared to a case of training the classification model so as to replicate classification of individual pieces of training data.

A learning program according to another aspect of the present invention causes a computer provided with at least one hardware processor and at least one memory to execute generating one piece of composite data by compositing a plurality of pieces of training data of which classification has each been set, or a plurality of pieces of converted data obtained by converting the plurality of pieces of training data, at a predetermined ratio, inputting one or a plurality of pieces of the composite data into a classification model, and updating a parameter of the classification model so that classification of the plurality of pieces of training data included in the composite data is replicated at the predetermined ratio by output of the classification model.

According to this aspect, by training the classification model to replicate the ratio of classification of the plurality of pieces of training data included in the composite data, the classification model can be trained so as to further raise the correct answer rate of classification by the classification model as compared to a case of training the classification model so as to replicate classification of individual pieces of training data.

A learning device according to another aspect of the present invention includes a generating unit that generates one piece of composite data by compositing a plurality of pieces of training data of which classification has each been set, or a plurality of pieces of converted data obtained by converting the plurality of pieces of training data, at a predetermined ratio, an introducing unit that inputs one or a plurality of pieces of the composite data into a classification model, and an updating unit that updates a parameter of the classification model so that classification of the plurality of pieces of training data included in the composite data is replicated at the predetermined ratio by output of the classification model.

According to this aspect, by training the classification model to replicate the ratio of classification of the plurality of pieces of training data included in the composite data, the classification model can be trained so as to further raise the correct answer rate of classification by the classification model as compared to a case of training the classification model so as to replicate classification of individual pieces of training data.

A learning system according to another aspect of the present invention includes a database that stores an initial dataset of which classification has each been set, a classification model that outputs classification of input data, and a learning device including a generating unit that generates one piece of composite data by compositing a plurality of pieces of training data selected from the initial dataset, or a plurality of pieces of converted data obtained by converting the plurality of pieces of training data, at a predetermined ratio, an introducing unit that inputs one or a plurality of pieces of the composite data into a classification model, and an updating unit that updates a parameter of the classification model so that classification of the plurality of pieces of training data included in the composite data is replicated at the predetermined ratio by output of the classification model.

According to this aspect, by training the classification model to replicate the ratio of classification of the plurality of pieces of training data included in the composite data, the classification model can be trained so as to further raise the correct answer rate of classification by the classification model as compared to a case of training the classification model so as to replicate classification of individual pieces of training data.

Advantageous Effects of Invention

According to the present invention, a learning method, a learning program, a learning device, and a learning system, for training a classification model, to further raise the correct answer rate of classification by a classification model, can be provided.

BRIEF DESCRIPTION OF DRAWINGS

FIG. 6 is a diagram illustrating classification performance regarding a case of training a classification model regarding classification of sound data by the learning method according to the present embodiment, and a case of training a classification model regarding classification of sound data by a conventional learning method.

DESCRIPTION OF EMBODIMENTS

An embodiment of the present invention will be described with reference to the attached figures. Note that items in the figures denoted by the same symbols have the same or similar configurations.

Figure 1:
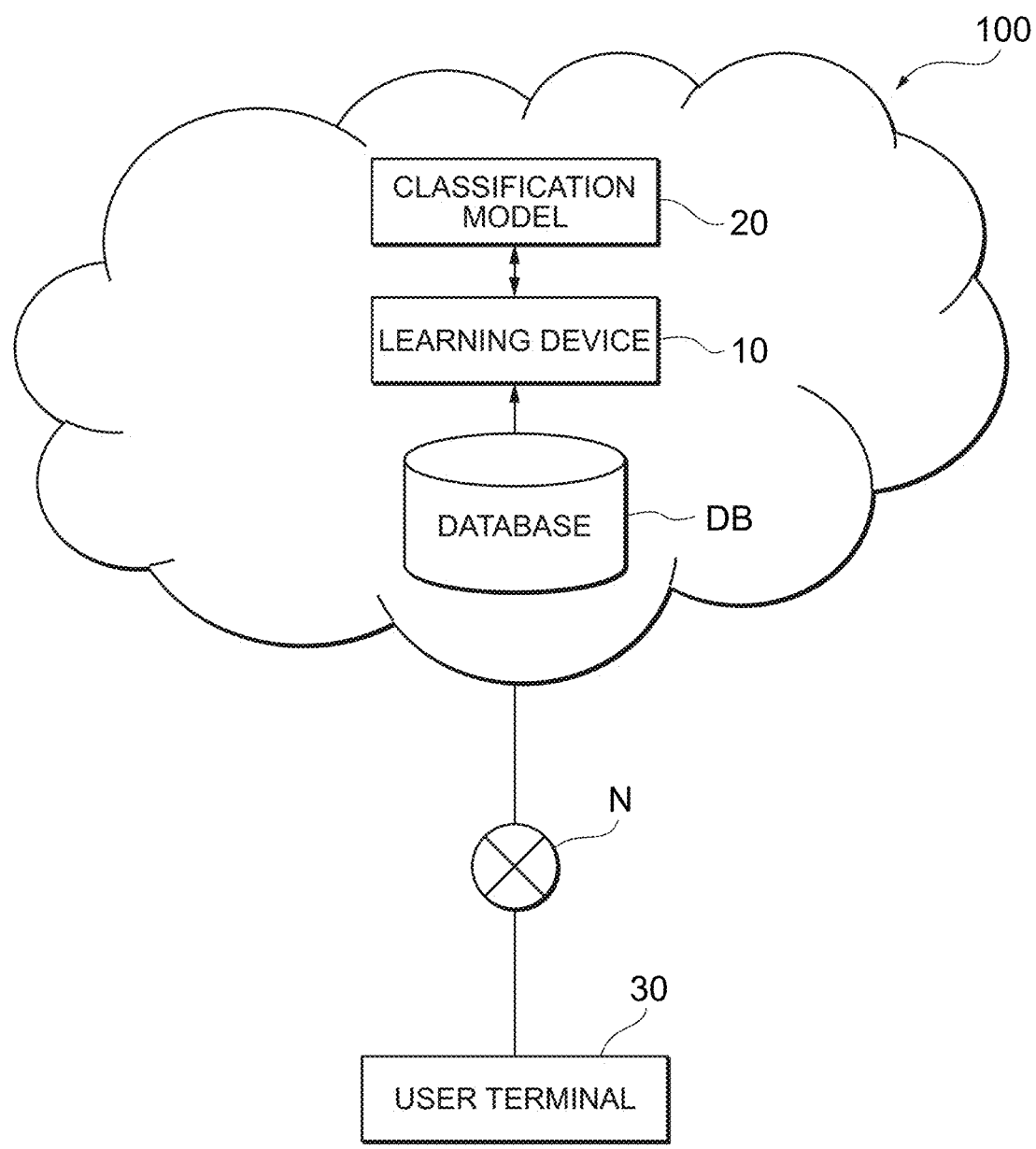
FIG. 1 is a network configuration diagram of a learning system according to an embodiment of the present invention.

FIG. 1 is a network configuration diagram of a learning system 100 according to an embodiment of the present invention. The learning system 100 includes a database DB that stores an initial dataset where the classification each has been set, a classification model 20 that outputs classification of input data, and a learning device 10 that trains the classification model 20 using the initial dataset stored in the database DB, so that data is correctly classified by the classification model 20. The learning system 100 may be connected to a communication network N, and add to or edit the initial dataset stored in the database DB, perform learning of the classification model 20, and so forth, based on instructions from a user terminal 30. The communication network N here is a wired or wireless communication network, and may be the Internet or a LAN (Local Area Network), for example. All or part of the components of the learning system 100 according to the present embodiment may be configured of remote computers in the form of so-called cloud computing, and alternatively, all or part of the components may be configured of local computers.

The classification model 20 is a model that classifies input data into a plurality of classes, and for example may be a model using a neural network, or may be a model using a support vector machine, or may be any model. The classification model 20 may be a different model depending on the type of input data. Input data to be input to the classification model 20 may be sound data, image data, and text data, and so forth.

The learning device 10 may train the classification model 20 that has not performed learning yet by the learning method according to the present embodiment, or may train the classification model 20 that has performed learning by a general learning method by the learning method according to the present embodiment, using the initial dataset stored in the database DB, so that data is correctly classified by the classification model 20.

Figure 2:
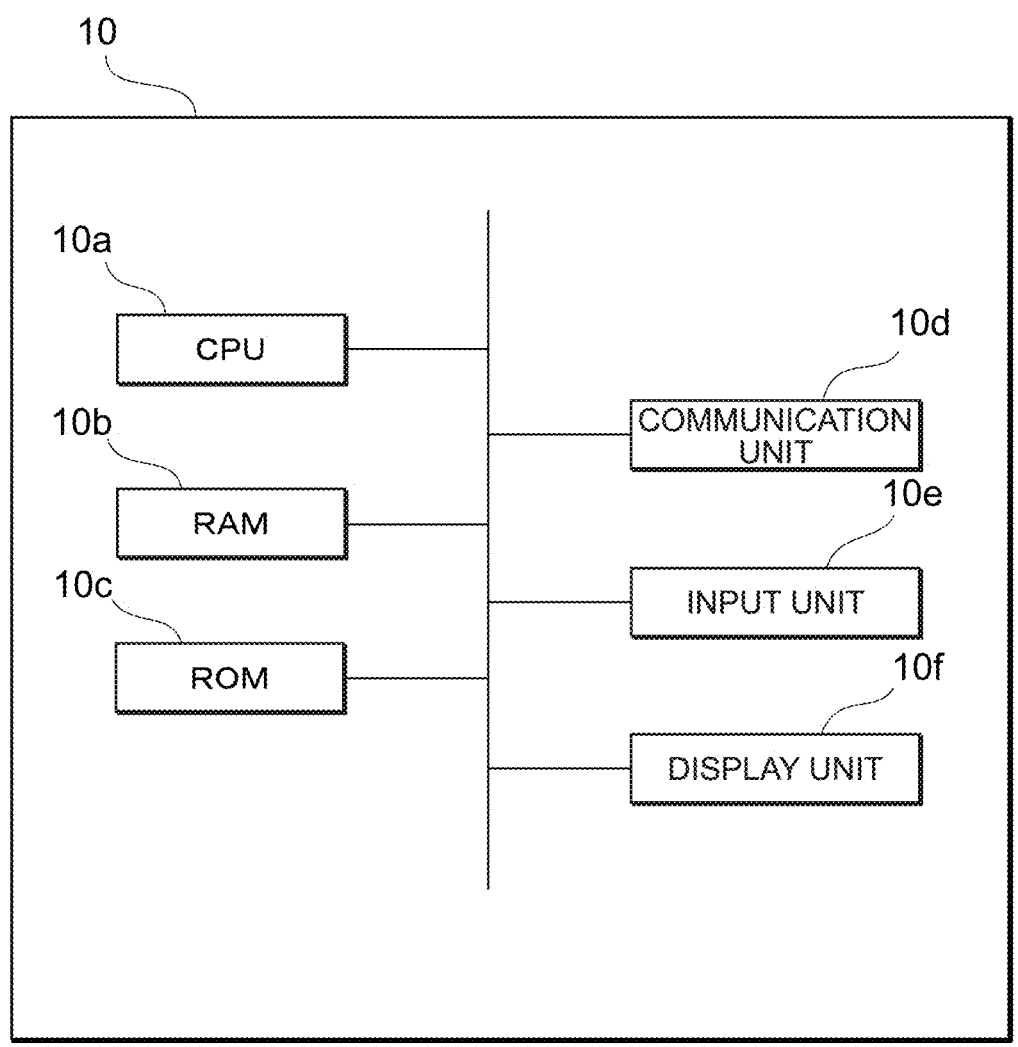
FIG. 2 is a diagram illustrating a physical configuration of a learning device according to the present embodiment.

FIG. 2 is a diagram illustrating the physical configuration of the learning device 10 according to the present embodiment. The learning device 10 has a CPU (Central Processing Unit) 10*a* corresponding to a hardware processor, RAM (Random Access Memory) 10*b* corresponding to memory, ROM (Read Only Memory) 10*c* corresponding to memory, a communication unit 10*d*, an input unit 10*e*, and a display unit 10f. These configurations are each connected via a bus so as to be capable of mutually transmitting and receiving data.

The CPU 10a is a control unit that performs control regarding executing of programs stored in the RAM 10b or ROM 10c, and computation and modification of data. The CPU 10a is a computation device that executes a program to train the classification model 20 (learning program). The CPU 10a receives various types of input data from the input unit 10e and communication unit 10d, and displays computation results of the input data on the display unit 10f, stores in the RAM 10b or ROM 10c, and so forth.

The RAM 10b is a storage unit in which data can be rewritten, and is configured of a semiconductor storage device, for example. The RAM 10b stores programs such as applications and so forth that the CPU 10a executes, data, and so forth.

The ROM 10c is a storage unit from which data can only be read out, and is configured of a semiconductor storage device, for example. The ROM 10c stores programs such as firmware or the like, for example, and data.

The communication unit 10d is a communication interface that connects the learning device 10 to the communication network N.

The input unit 10e is for accepting input of data from a user, and is configured of a keyboard, mouse, and touch panel, for example.

The display unit 10f is for visually displaying results of computation by the CPU 10a, and is configured of an LCD (Liquid Crystal Display), for example.

The learning program may be provided by being stored in a computer-readable storage medium such as the RAM 10b, ROM 10c, or the like, or may be provided via the communication network N to which connection is made by the communication unit 10d. Various functions described by way of the next figure are realized in the learning device 10 by the CPU 10a executing the learning program. Note that these physical configurations are exemplary, and do not necessarily have to be independent configurations. For example, the learning device 10 may be provided with an LSI (Large-Scale Integration) where the CPU 10a, RAM 10b, and ROM 10c have been integrated. The learning device 10 may also be provided with computing circuits such as a GPU (Graphics Processing Unit), FPGA (Field-Programmable Gate Array), ASIC (Application Specific Integrated Circuit), or the like.

Figure 3:
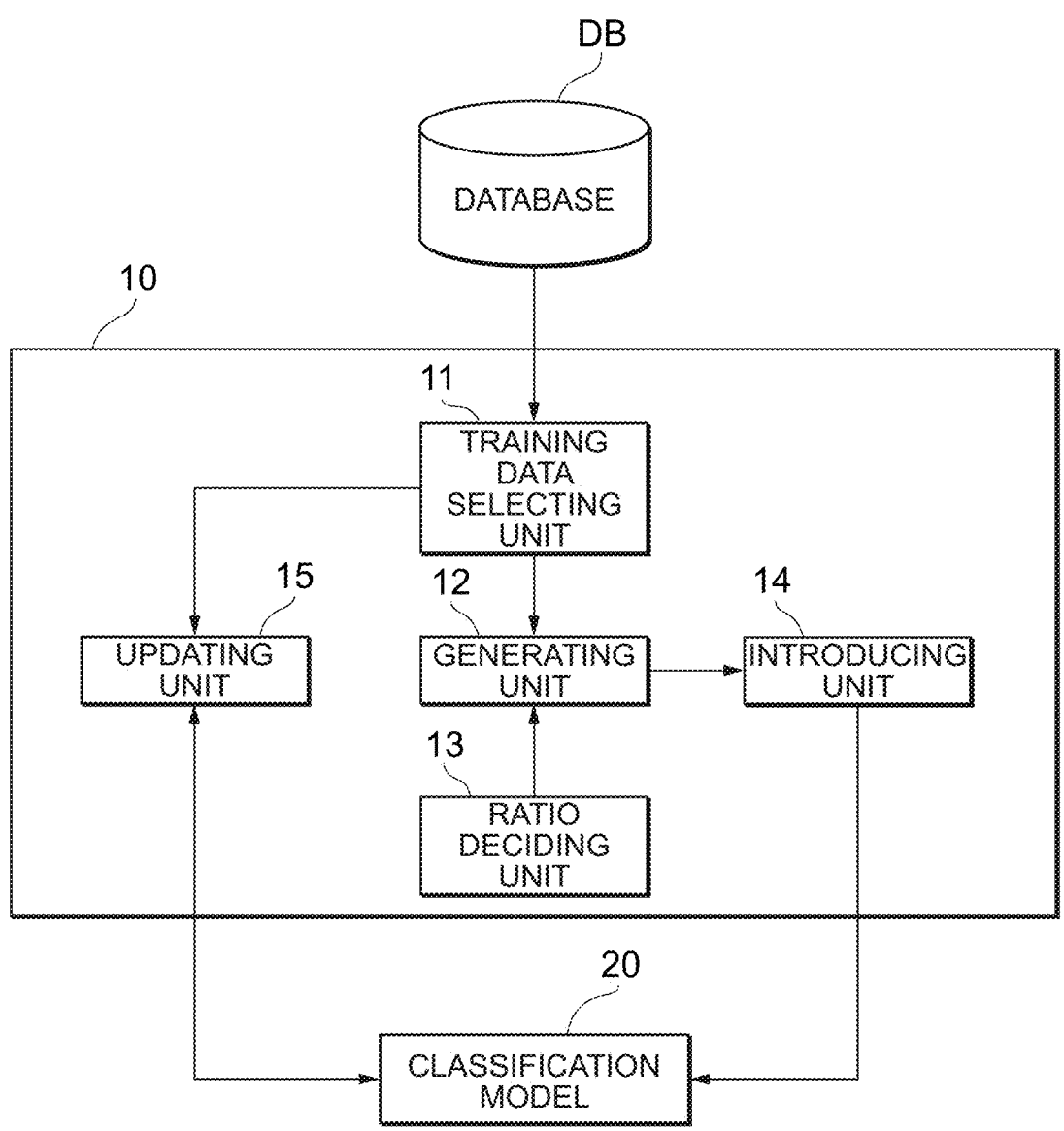
FIG. 3 is a functional block diagram of the learning device according to the present embodiment.

FIG. 3 is a functional block diagram of the learning device 10 according to the present embodiment. The learning device 10 is provided with a training data selecting unit 11, a generating unit 12, a ratio determining unit 13, an introducing unit 14, and an updating unit 15.

The training data selecting unit 11 selects a plurality of pieces of training data from the initial dataset stored in the database DB. The training data selecting unit 11 may randomly select data from the initial dataset stored in the database DB. The training data selecting unit 11 may randomly select two pieces of data from the initial dataset, for example, or may randomly select three or more pieces of data. The training data selecting unit 11 may generate a random number by uniform distribution, Gaussian distribution, or the like, and randomly select data from the initial dataset stored in the database DB on the basis of this random number.

Selecting a plurality of pieces of training data from the initial dataset and forming composite data enables the number of pieces of data serving as sources for compositing composite data to be increased by the number of combinations of the initial dataset, and accordingly the classification model can be trained with diverse data.

Also, randomly selecting a plurality of pieces of training data from the initial dataset enables diverse composite data to be generated, the classification model can be trained so that the precision of output of the classification model is further raised, and the classification model can be trained so as to further raise the correct answer rate of classification by the classification model, even in a case where the count of training data is limited.

The generating unit 12 composites a plurality of pieces of training data of which classification has each been set, or a plurality of pieces of converted data obtained by converting the plurality of pieces of training data, at a predetermined ratio, thereby generating one piece of composite data. The generating unit 12 may convert a plurality of pieces of training data to generate a plurality of pieces of converted data before execution of generating composite data, and composite the plurality of pieces of converted data at a predetermined ratio, thereby generating one piece of composite data. Now, in a case where the training data is sound data, the converted data may be generated by randomly clipping snippets of sound data, randomly changing the sound pressure level, pitch, speed, etc., of sound data, and so forth. Also, in a case where the training data is image data, the converted data may be generated by randomly cropping image data, randomly enlarging/reducing image data, rotating, changing the aspect ratio, changing RGB values, and so forth. Thus, the classification model can be trained with even more diverse data by obtaining a plurality of pieces of converted data by formatting a plurality of pieces of training data, subjecting a plurality of pieces of training data to data augmentation, and generating composite data by compositing these at a predetermined ratio.

Also, the generating unit 12 may input a plurality of pieces of training data, or a plurality of pieces of converted data obtained by converting the plurality of pieces of training data, into the classification model 20, and obtain a plurality of intermediate outputs of the classification model 20 before executing generating of composite data, and generate one piece of composite data by compositing the plurality of intermediate outputs at a predetermined ratio.

In a case where the plurality of pieces of training data are a plurality of pieces of sound data, the generating unit 12 overlays the plurality of pieces of sound data at a predetermined ratio to generate one piece of composite sound data. The plurality of pieces of sound data here may be overlaid at a predetermined ratio for each sample. Also, in a case where the plurality of pieces of training data are a plurality of pieces of image data, the generating unit 12 adds pixel values at a predetermined ratio to generate one piece of composite image data, for each pixel of the plurality of pieces of image data. Further, in a case where the plurality of pieces of training data are a plurality of pieces of text data, the generating unit 12 convers the plurality of pieces of text data into a plurality of pieces of vector data, and adds the plurality of pieces of vector data at a predetermined ratio, to generate one piece of composite vector data. Note that the overlaying of the plurality of pieces of sound data at a predetermined ratio to generate one piece of composite sound data may be performed by overlaying sound data that is digital data, but alternatively may be performed by overlaying sound data that is analog data. That is to say, a plurality of pieces of sound data may be simultaneously played at volumes according to a predetermined ratio and recorded, thereby generating one piece of composite sound data. Also, the adding pixel values at a predetermined ratio for each pixel of a plurality of pieces of image data to generate one piece of composite image data may be performed by adding image data that is digital data, but alternatively may be performed by adding image data that is analog data. That is to say, a plurality of pieces of image data may be displayed at light quantities according to a predetermined ratio and overlaid and imaged by an optical system thereby generating one piece of composite image data.

The ratio determining unit 13 determines the predetermined ratio that the generating unit 12 uses at the time of generating composite data. The ratio determining unit 13 may randomly select one numeric value from a predetermined numeric value range, and determine the predetermined ratio on the basis of the selected numeric value. The ratio determining unit 13 may, for example, randomly select one numeric value from a numeric value range of 0 to 1, and take the selected numeric value to be the predetermined ratio. The ratio determining unit 13 here may randomly generate one numeric value from a predetermined numeric value range by uniform distribution, Gaussian distribution, or the like. The ratio determining unit 13 may also randomly select one numeric value from a predetermined numeric value range, and determine the predetermined ratio according to a function of the selected numeric value. The ratio determining unit 13 may determine the predetermined ratio each time that composite data is generated by the generating unit 12. Each time that a plurality of pieces of training data are selected from the initial dataset by the training data selecting unit 11, the ratio determining unit 13 may determine a predetermined ratio to be used at the time of compositing these plurality of pieces of training data.

Making the ratio of compositing the training data variable enables composite data of different content to be generated even in a case of using the same training data, and diversity of data used for learning by the classification model can be increased.

Also, randomly selecting the ratio for compositing training data enables diverse composite data to be generated even in a case where the count of training data is limited. Accordingly, the classification model can be trained so as to further raise the precision of output of the classification model, and the classification model can be trained so as to further raise the correct answer rate of classification by the classification model.

Further, executing determining of the ratio for compositing training data each time generating of the composite data is executed enables learning to be performed regarding composite data of different content each time iteration is performed, even in a case where the iteration count of learning is great, and the classification model can be trained by diverse data.

The introducing unit 14 inputs one or a plurality of pieces of composite data generated by the generating unit 12 into the classification model 20. The introducing unit 14 may sequentially input the plurality of pieces of composite data into the classification model 20, or may input the plurality of pieces of composite data into the classification model 20 all at once. In a case where the classification model 20 is a neural network, the introducing unit 14 may input the composite data into the input layer of the neural network.

It should be noted that in a case where the generating unit 12 obtains a plurality of intermediate outputs of the classification model 20, and composites the plurality of intermediate outputs at a predetermined ratio to generate one piece of composite data, the introducing unit 14 may input one or a plurality of pieces of composite data into a subsequent stage of the configuration of the classification model 20 that has output the intermediate outputs. In a case where the classification model 20 is a neural network, the introducing unit 14 may input the composite data to the next layer after the layer that has output the intermediate outputs, out of the plurality of layers included in the neural network. By obtaining intermediate outputs of the classification model 20, generating composite data by compositing thereof at a predetermined ratio, and inputting the composite data into a subsequent stage of the configuration of the classification model 20 that has output the intermediate outputs, the classification model 20 can be trained so as to further raise the precision of output of the classification model 20, and the classification model can be trained so as to further raise the correct answer rate of classification by the classification model.

The updating unit 15 updates parameters of the classification model 20 so that classification of the plurality of pieces of training data included in the composite data is replicated at the predetermined ratio by output of the classification model 20. For example, in a case where composite data including first training data at a ratio of 0.2 and including second training data at a ratio of 0.8 is input to the classification model 20, the updating unit 15 updates parameters of the classification model 20 so that the output value of the class corresponding to the first training data is 0.2 and the output value of the class corresponding to the second training data is 0.8, by the output of the classification model 20.

Figure 4:
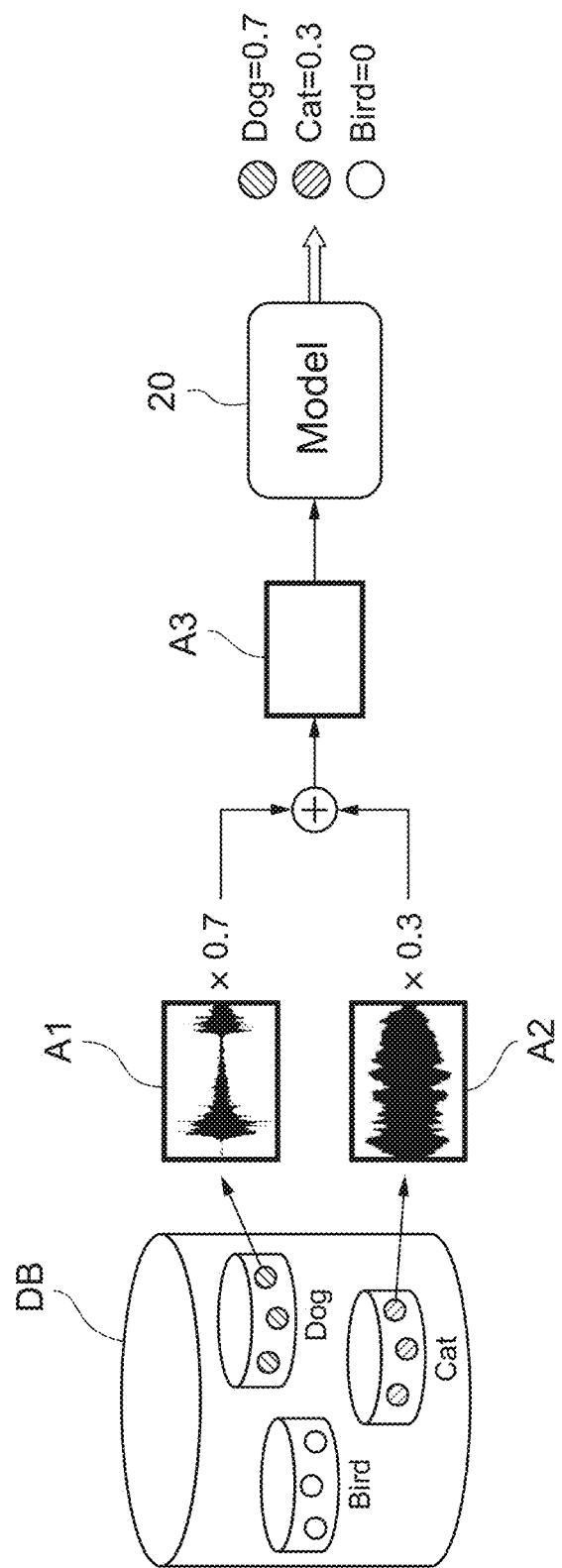
FIG. 4 is a conceptual diagram of a case of training a classification model regarding classification of sound data by a learning method according to the present embodiment.
Figure 5:
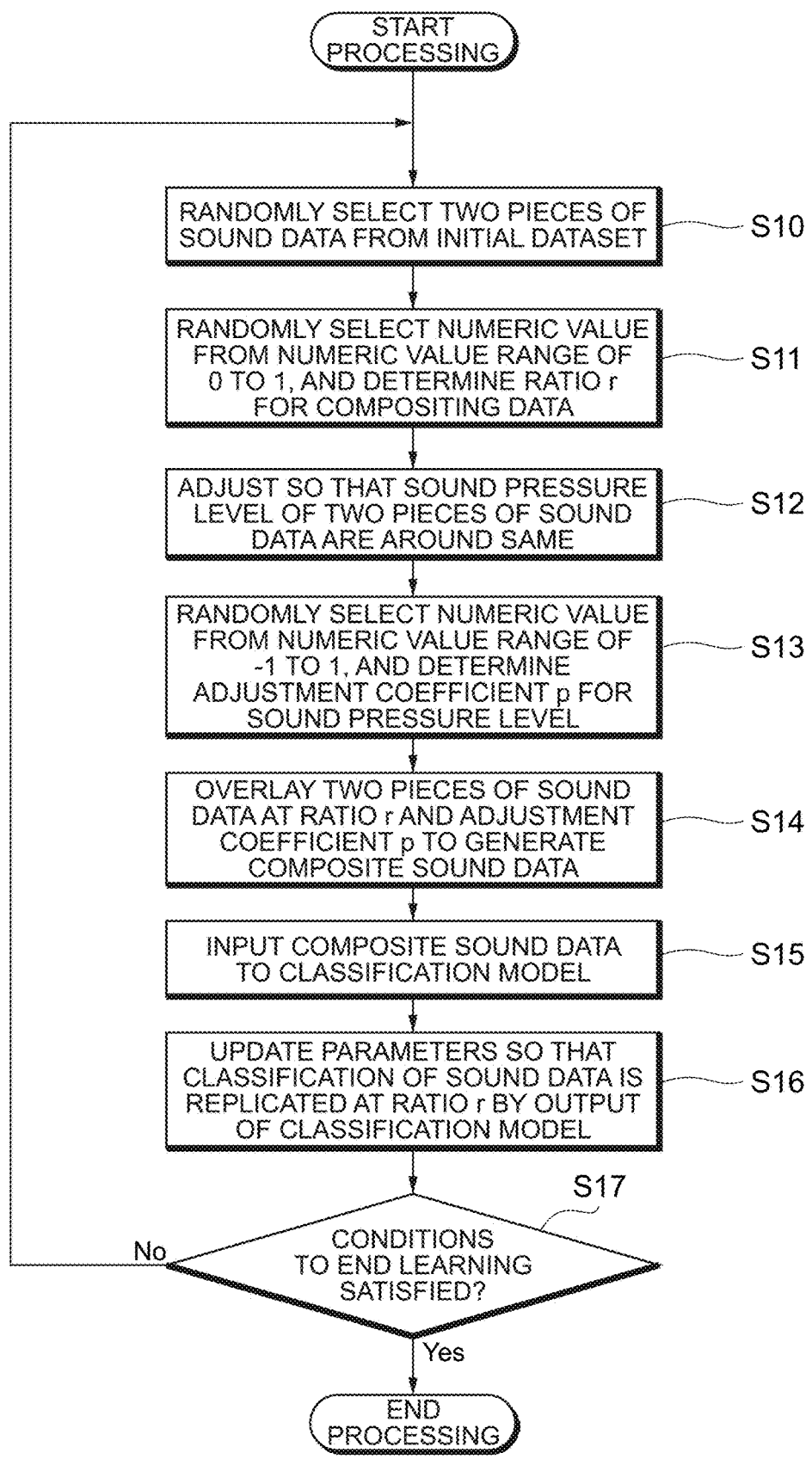
FIG. 5 is a flowchart of a case of training a classification model regarding classification of sound data by the learning method according to the present embodiment.

The following is a description of a case of training the classification model 20 regarding classification of sound data by the learning method according to the present embodiment, by way of FIGS. 4, 5, and 6.

FIG. 4 is a conceptual diagram of a case of training the classification model 20 regarding classification of sound data by the learning method according to the present embodiment. In the learning method according to the present embodiment, random selection of two pieces of data from an initial dataset stored in the database DB is executed before executing generating of composite data. In the present example, the database DB includes a plurality of pieces of sound data classified under dogs (Dog), a plurality of pieces of sound data classified under cats (Cat), and a plurality of pieces of sound data classified under birds (Bird), with first sound data A1 relating to dogs and second sound data A2 relating to cats having been selected as source data from which to generate composite data.

One numeric value is randomly selected from a predetermined numeric value range to determine the predetermined ratio, before executing generating of composite data, in the learning method according to the present embodiment. In the present example, a numeric value of 0.7 has been selected as a result of one numeric value having been randomly selected from a numeric value range from 0 to 1, and 0.7 has been determined as the predetermined ratio.

Thereafter, composite sound data A3 is generated so as to include the first sound data A1 at a ratio of 0.7 and to include the second sound data A2 at a ratio of 0.3. The generated composite sound data A3 is input to the classification model 20, and parameters of the classification model 20 are updated by the output of the classification model 20 so that classification of the dog class is 0.7, classification of the cat class is 0.3, and classification of the bird class is 0. It should be understood that parameters of the classification model 20 are not optimized by updating parameters of the classification model 20 just once, and the above processing is to be repeatedly executed. Note that in the present example, a case of generating composite sound data by compositing two pieces of sound data at a predetermined ratio has been described, but composite sound data may be generated by compositing three or more pieces of sound data at a predetermined ratio.

FIG. 5 is a flowchart of a case of training the classification model 20 regarding classification of sound data by the learning method according to the present embodiment. First, two pieces of sound data are randomly selected by the training data selecting unit 11 from the initial dataset stored in the database DB (S10). Selection of sound data may be performed by extracting a randomly-selected part from a series of sound data.

The ratio determining unit 13 randomly selects a numeric value from the numeric value range of 0 to 1, and determines a ratio r for compositing the training sound data (S11). Subsequently, the generating unit 12 performs adjustment so that the sound pressure levels of the two pieces of sound data are around the same (S12). For example, in a case where the greatest sound pressure level of the first sound data A1 is P1, and the greatest sound pressure level of the second sound data A2 is P2, the generating unit 12 may adjust the sound pressure level of the two pieces of sound data by multiplying the second sound data A2 by $10^{(P1-P2)/20}$.

Further, the generating unit 12 randomly selects a numeric value from a numeric value range of −1 to 1, and determines an adjustment coefficient p of the sound pressure level (S13). The generating unit 12 then overlays the two pieces of sound data using the ratio r and adjustment coefficient p to generate composite sound data (S14). More specifically, the generating unit 12 may multiply the first sound data A1 by r, multiply the second sound data A2 after sound pressure adjustment by (1−r), add both pieces of data, divide the whole by $(r^2+(1-r^2))^{1/2}$, and multiply by $2^p$, thereby obtaining the composite sound data A3. Here, dividing by $(r^2+(1-r^2))^{1/2}$ is done to make the sound pressure level of the composite sound data A3 to be around the same as that of the first sound data A1 and second sound data A2 after sound pressure adjustment. Also, multiplying the sound data by $2^p$ using the randomly-selected adjustment coefficient p enables the sound pressure level to be varied each time the composite sound data is generated, and diversity of training data can be increased. Note that the generating unit 12 may generate composite sound data by randomly changing the speed or pitch of the plurality of pieces of sound data added at the predetermined ratio.

The introducing unit 14 inputs composited sound data to the classification model 20 (S15). The updating unit 15 then updates the parameters so that the classification of two pieces of sound data included in the composite sound data is replicated by the ratio r by the output of the classification model 20 (S16). For example, in a case of multiplying the first sound data A1 by r, and multiplying the second sound data A2 after sound pressure adjustment by (1−r), and generating composite data, the updating unit 15 updates the parameters of the classification model 20 so that the classification of the dog class is r, and the classification of the cat class is 1−r, by the output of the classification model 20. Now, in a case where the classification model 20 is a neural network for example, parameters of the classification model 20 are weight coefficients. In a case where the classification model 20 is a neural network and the output layer is a softmax layer, the updating unit 15 may update the weight coefficients using a backpropagation method to minimize cross entropy and Kullback-Leibler divergence between output values of the classification model 20 and correct answer values of classification set beforehand regarding training data. More specifically, in a case of multiplying the first sound data A1 by r, and multiplying the second sound data A2 after sound pressure adjustment by (1−r), generating composite data, and yielding an output vector of y by the classification model 20, the weight coefficients may be updated to minimize cross entropy H (t, y) and Kullback-Leibler divergence $D_{KL}$ (t∥y), with a vector t=r×t1+(1−r)×t2 that includes a correct answer vector t1 representing the dog class at the ratio r, and that includes a correct answer vector t2 representing the cat class at the ratio (1−r), as a correct answer vector t.

The learning device 10 determines whether or not conditions to end learning have been satisfied (S17). Although conditions to end learning may be optionally set here, this may be, for example, that a value of an objective function such as cross entropy or Kullback-Leibler divergence to be a predetermined value or lower, that the update count of parameters of the classification model 20 has reached a predetermined count, or that change in the value of an objective function before and after updating parameters is a predetermined value or lower. In a case where conditions to end learning have not been satisfied (S17: No), sound data for training is randomly selected from the initial dataset anew, composited at a randomly-determined ratio, input to the classification model 20, and parameters of the classification model 20 are updated. In contrast, in a case where conditions to end learning have been satisfied (S17: Yes), the learning processing is ended.

FIG. 6 is a diagram illustrating classification performance regarding a case of training the classification model 20 regarding classification of sound data by the learning method according to the present embodiment, and a case of training the classification model 20 regarding classification of sound data by a conventional learning method. This figure shows the correct answer rate in a case of learning by a conventional learning method, and the correct answer rate in a case of learning by the learning method according to the present embodiment, with regard to two types of classification models. A second type of classification model here is a model that is more complicated than a first type of classification model, and is a model that is relatively difficult to train. The correct answer rates illustrated in this figure are values in a case of using the same initial dataset and the same classification model 20, with only the learning method having been changed. The correct answer rates are values where learning by the classification model 20 has sufficiently advanced, and are near the upper limit value that can be achieved by that learning method.

With regard to the first type of classification model, the correct answer rate in a case of learning by the conventional learning method is 68.3%, and the correct answer rate in a case of learning by the learning method according to the present embodiment is 74.3%. Accordingly, results that the correct answer rate improves by 6% even if the classification model 20 is the same were obtained by using the learning method according to the present embodiment.

Also, with regard to the second type of classification model, the correct answer rate in a case of learning by the conventional learning method is 71.7%, and the correct answer rate in a case of learning by the learning method according to the present embodiment is 80.7%. Results that the correct answer rate improves by 9% by using the learning method according to the present embodiment, even if the classification model 20 is the same, were obtained regarding the second type of classification model as well. Note that the correct answer rate in a case of manually classifying the sound data used in the present experiment is approximately 80%. The classifying performance of the classification model 20 can be improved to a level equivalent to humans by using the learning method according to the present embodiment. Also, by using the learning method according to the present embodiment, 6% improvement in correct answer rate was observed over the conventional learning method in the case of the first type of classification model, and 9% improvement in correct answer rate was observed over the conventional learning method in the case of the second type of classification model. Accordingly, it can be said that the learning method according to the present embodiment is more effective in a case of being used for learning with a relatively complicated model.

According to the learning method of the present embodiment, a classification model can be trained so that precision of output of the classification model is further raised by training the classification model so as to replicate the ratio of classification of a plurality of pieces of training data included in composite data, as compared to a case of training the classification model so as to replicate classification of individual pieces of training data, and the classification model can be trained to further raise the correct answer rate of classification by the classification model. Also, according to the learning method of the present embodiment, diverse composite data can be generated by variously selecting combinations of training data and ratios for compositing training data, and accordingly the classification model can be trained in a stable manner so as to further raise the correct answer rate of classification by the classification model, even in a case where the training data count is limited and the classification model is a complicated model.

Also, training the classification model so as to replicate the ratio of classification in a plurality of pieces of sound data that have been overlaid enables the classification model to be trained so as to further raise the precision of output of the classification model as compared to a case where the classification model is trained so as to replicate classification of individual pieces of sound data.

Cases of training a classification model regarding classification of image data by the learning method according to the present embodiment will be described below by way of FIGS. 7, 8, 9, and 10.

Figure 7:
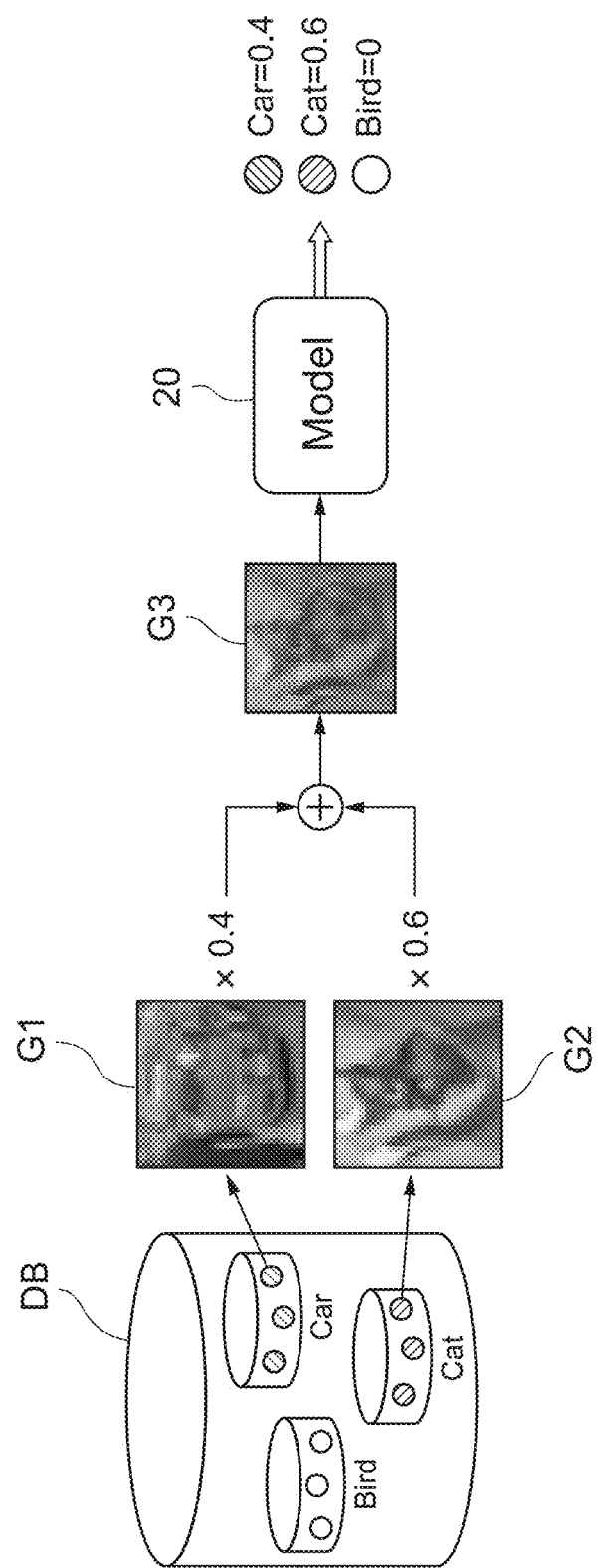
FIG. 7 is a conceptual diagram of a case of training a classification model to classify image data by the learning method according to the present embodiment.

FIG. 7 is a conceptual diagram of a case of training a classification model to classify image data by the learning method according to the present embodiment. In the learning method according to the present embodiment, random selection of two pieces of data out of an initial dataset stored in the database DB is executed before executing generating of composite data. In the present example, the database DB includes a plurality of pieces of image data classified under cars (Car), a plurality of pieces of image data classified under cats (Cat), and a plurality of pieces of image data classified under birds (Bird), with first image data G1 relating to cars and second image data G2 relating to cats having been selected as source data from which to generate composite data.

One numeric value is randomly selected from a predetermined numeric value range to determine the predetermined ratio, before executing generating of composite data, in the learning method according to the present embodiment. In the present example, a numeric value of 0.4 has been selected as a result of one numeric value having been randomly selected from a numeric value range from 0 to 1, and 0.4 has been determined as the predetermined ratio.

Thereafter, composite image data G3 is generated so as to include the first image data G1 at a ratio of 0.4 and to include the second image data G2 at a ratio of 0.6. The generated composite image data G3 is input to the classification model 20, and parameters of the classification model 20 are updated by the output of the classification model 20 so that classification of the car class is 0.4, classification of the cat class is 0.6, and classification of the bird class is 0. It should be understood that parameters of the classification model 20 are not optimized by updating parameters of the classification model 20 just once, and the above processing is to be repeatedly executed. Note that in the present example, a case of generating composite image data by compositing two pieces of image data at a predetermined ratio has been described, but composite image data may be generated by compositing three or more pieces of image data at a predetermined ratio.

Figure 8:
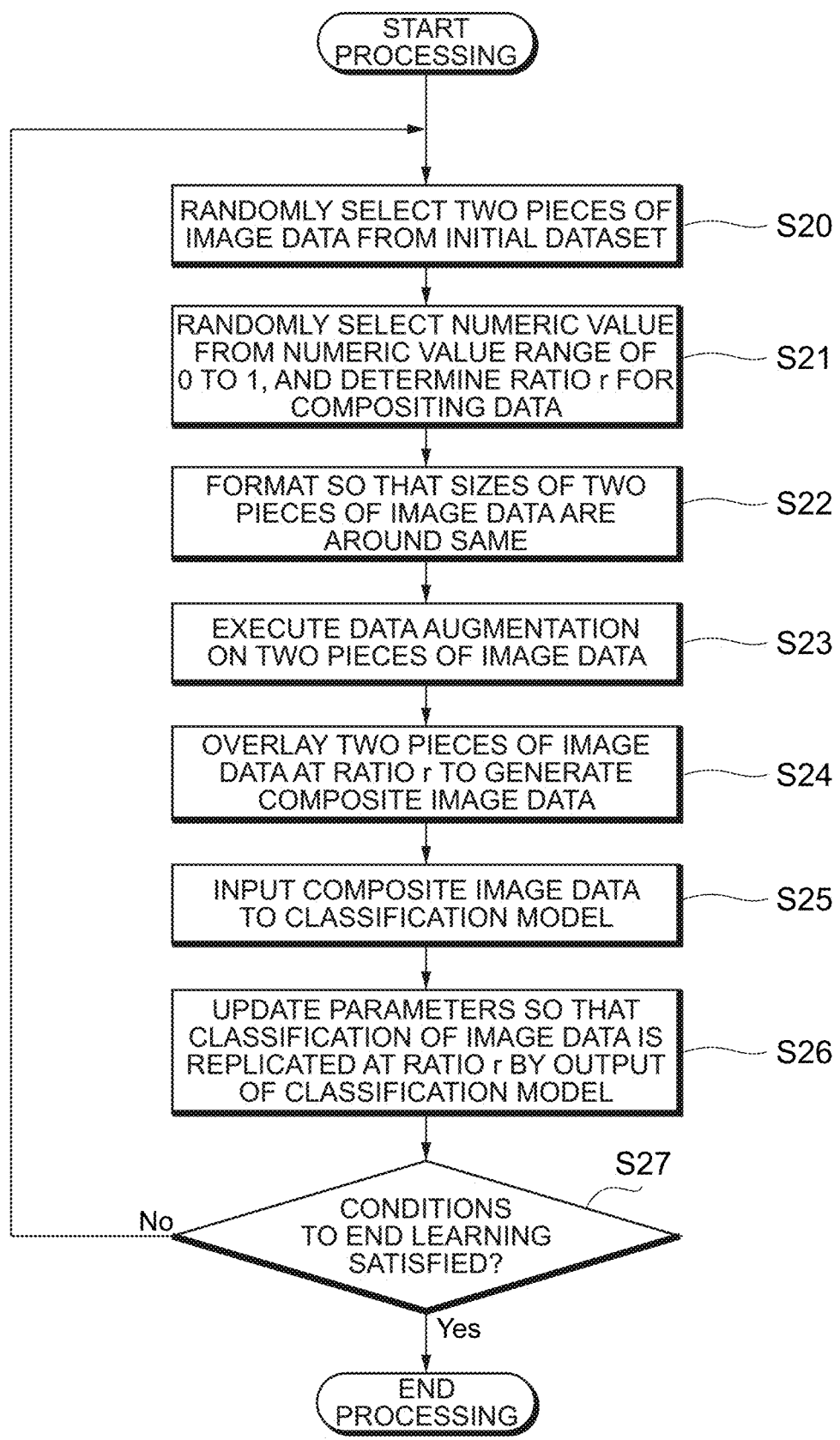
FIG. 8 is a flowchart of first processing of training a classification model to classify image data by the learning method according to the present embodiment.

FIG. 8 is a flowchart of first processing of training the classification model 20 regarding classification of image data by the learning method according to the present embodiment. In the first processing where the classification model 20 is trained regarding classification of image data, first, two pieces of image data are randomly selected by the training data selecting unit 11 from the initial dataset stored in the database DB (S20).

The ratio determining unit 13 randomly selects a numeric value from the numeric value range of 0 to 1, and determines a ratio r for compositing the training image data (S21). Subsequently, the generating unit 12 performs data formatting regarding the two pieces of image data selected by the training data selecting unit 11, so that the sizes thereof are around the same (S22). Now, the generating unit 12 may perform data formatting by cropping a region of a predetermined size at a randomly-selected position. The generating unit 12 also executes data augmentation with regard to the two pieces of image data (S23). Data augmentation here includes enlarging or reducing images at a random ratio, performing rotation or parallel translation of images in random directions, changing the aspect ratio at a random ratio, changing RGB values by random values, and so forth. It should be understood that data formatting and data augmentation are processes that can be omitted.

The generating unit 12 then adds the pixel values by the ratio r for each pixel in the two pieces of image data and generates the composite image data G3 (S24). More specifically, the generating unit 12 may multiply a particular pixel value in the first image data G1 by r, multiply a corresponding pixel value regarding the second image data G2 by (1−r), and add both pieces of data, thereby obtaining a particular pixel value of the composite image data G3.

The introducing unit 14 then inputs the composite image data to the classification model 20 (S25). In a case where the classification model 20 is a neural network, the introducing unit 14 inputs the composite image data to the input layer of the neural network. The updating unit 15 then updates the parameters so that the classification of two pieces of image data included in the composite image data is replicated by the ratio r by the output of the classification model 20 (S26). For example, in a case of multiplying the first image data G1 by r, and multiplying the second image data G2 by (1−r), and generating composite data, the updating unit 15 updates the parameters of the classification model 20 so that the classification of the car class is r, and the classification of the cat class is 1-r, by the output of the classification model 20.

The learning device 10 determines whether or not conditions to end learning have been satisfied (S27). Although conditions to end learning may be optionally set here, this may be, for example, that a value of an objective function such as cross entropy or Kullback-Leibler divergence to be a predetermined value or lower, that the update count of parameters of the classification model 20 has reached a predetermined count, or that change in the value of an objective function before and after updating parameters is a predetermined value or lower. In a case where conditions to end learning have not been satisfied (S27: No), image data for training is randomly selected from the initial dataset anew, composited at a randomly-determined ratio, input to the classification model 20, and parameters of the classification model 20 are updated. In contrast, in a case where conditions to end learning have been satisfied (S27: Yes), the learning processing is ended.

According to the learning method of the present embodiment, training the classification model 20 so as to replicate the ratio of classification in a plurality of pieces of image data that have been overlaid enables the classification model 20 to be trained so as to further raise the precision of output of the classification model 20 as compared to a case where the classification model 20 is trained so as to replicate classification of individual pieces of image data, and the classification model 20 can be trained so as to further raise the correct answer rate of classification by the classification model 20.

Figure 9:
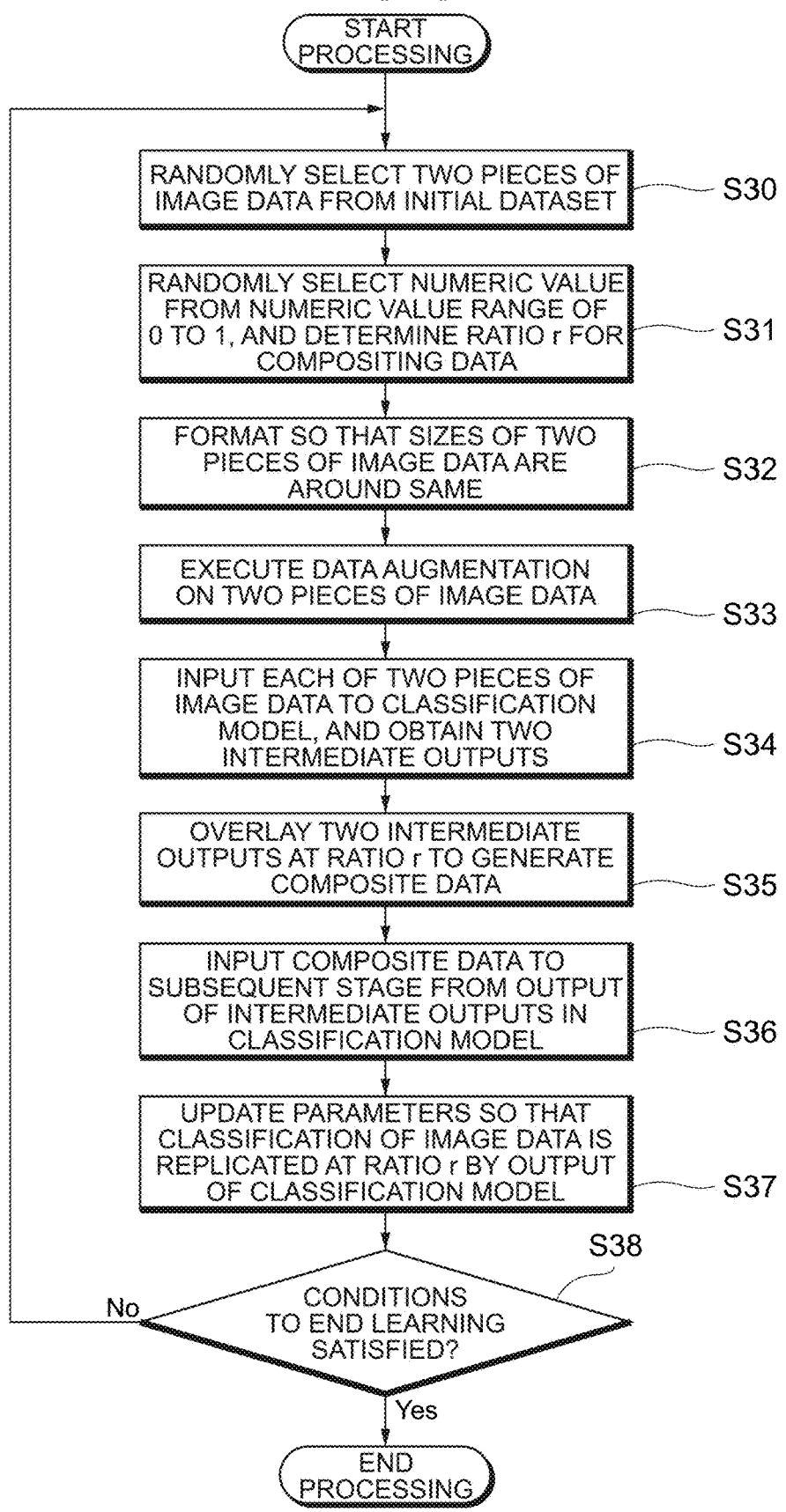
FIG. 9 is a flowchart of second processing of training a classification model to classify image data by the learning method according to the present embodiment.

FIG. 9 is a flowchart of second processing of training the classification model 20 regarding classification of image data by the learning method according to the present embodiment. The second processing of training the classification model 20 regarding classification of image data is processing where the classification model 20 is trained so that intermediate output of the classification model 20 is composited at a predetermined ratio to generate composite data, and classification of image data included in the composite data is replicated at a predetermined ratio.

First, two pieces of image data are randomly selected by the training data selecting unit 11 from the initial dataset stored in the database DB (S30). The ratio determining unit 13 randomly selects a numeric value from the numeric value range of 0 to 1, and determines a ratio r for compositing the training image data (S31). Subsequently, the generating unit 12 performs data formatting regarding the two pieces of image data selected by the training data selecting unit 11, so that the sizes thereof are around the same (S32). The generating unit 12 also executes data augmentation with regard to the two pieces of image data (S33). It should be understood that data formatting and data augmentation are processes that can be omitted.

Subsequently, the learning device 10 inputs each of the two pieces of image data into the classification model 20, and obtains intermediate output (S34). In a case where the classification model 20 here is a neural network, the two pieces of image data are each input to the input layer of the neural network. Also, the intermediate output may be output of any layer of the plurality of layers included in the neural network other than the output layer. The generating unit 12 adds the two intermediate outputs corresponding to the two pieces of image data at the ratio r to generate composite data (S35).

The introducing unit 14 inputs the composite data to a subsequent stage in the configuration that has output the intermediate outputs, in the classification model 20 (S36). In a case where the classification model 20 is a neural network, the introducing unit 14 inputs the composite data to the next layer after the layer of the neural network that has output the intermediate outputs. The updating unit 15 then updates the parameters so that the classification of two pieces of image data included in the composite data is replicated by the ratio r by the output of the classification model 20 (S37). For example, in a case of multiplying the intermediate output of the first image data G1 by r, and multiplying the intermediate output of the second image data G2 by (1−r), and generating composite data, the updating unit 15 updates the parameters of the classification model 20 so that the classification of the car class is r, and the classification of the cat class is 1−r, by the output of the classification model 20.

The learning device 10 determines whether or not conditions to end learning have been satisfied (S38). Although conditions to end learning may be optionally set here, this may be, for example, that a value of an objective function such as cross entropy or Kullback-Leibler divergence to be a predetermined value or lower, that the update count of parameters of the classification model 20 has reached a predetermined count, or that change in the value of an objective function before and after updating parameters is a predetermined value or lower. In a case where conditions to end learning have not been satisfied (S38: No), image data for training is randomly selected from the initial dataset anew and input to the classification model 20, from which intermediate output is obtained, the intermediate output is composited at a randomly-determined ratio and input to a subsequent stage of the configuration that has output the intermediate outputs in the classification model 20, and parameters of the classification model 20 are updated. In contrast, in a case where conditions to end learning have been satisfied (S38: Yes), the learning processing is ended.

Figure 10:
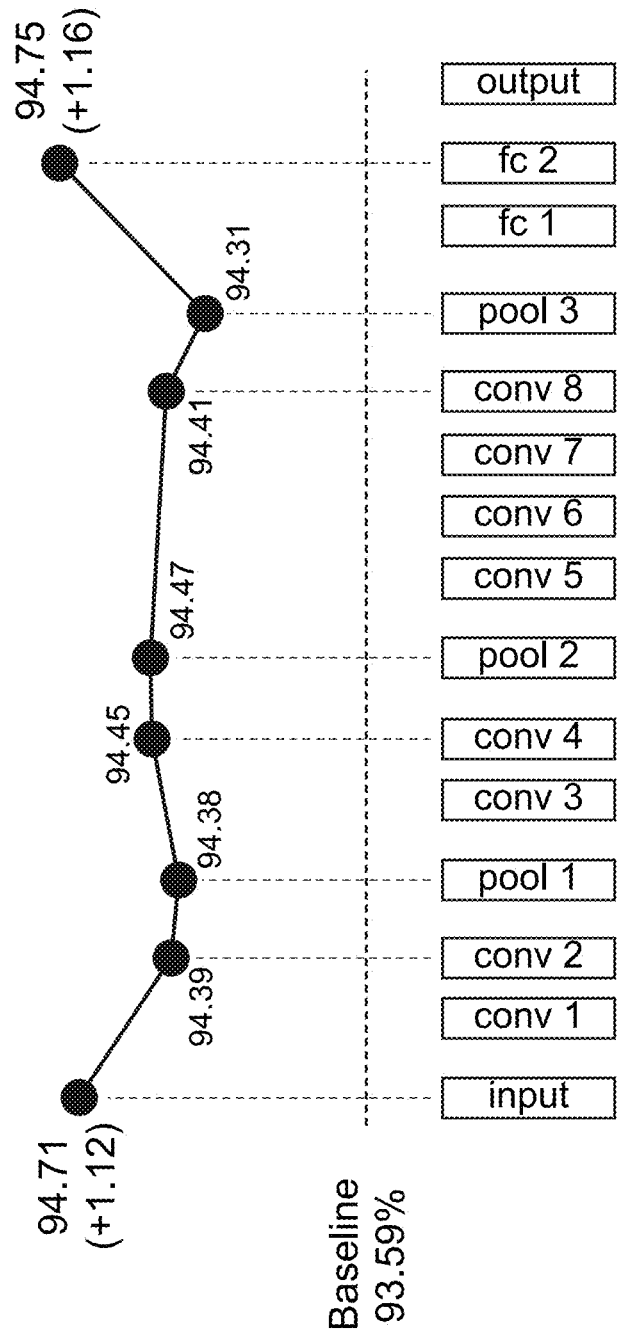
FIG. 10 is a diagram illustrating classification performance regarding a case of training a classification model regarding classification of image data by the learning method according to the present embodiment, and a case of training a classification model regarding classification of image data by a conventional learning method.

FIG. 10 is a diagram illustrating classification performance regarding a case of training the classification model 20 regarding classification of image data by the learning method according to the present embodiment, and a case of training the classification model 20 regarding classification of image data by a conventional learning method. In the example illustrated in this figure, the classification model 20 is a CNN (Convolutional Neural Network) that has an input layer (input), a plurality of convolution layers (cony 1 to 8), a plurality of pooling layers (pool 1 to 3), a plurality of fully-connected layers (fc 1 to 2), and an output layer (output). In this figure, one type of CNN is used as the classification model 20, and the correct answer rate in a case of learning by compositing intermediate output of a plurality of layers included in the CNN by the learning method according to the present embodiment is shown for the plurality of layers included in the CNN, with the correct answer rate in a case of learning by a conventional learning method shown as a Baseline. The correct answer rates here are values where learning by the classification model 20 has sufficiently advanced, and are near the upper limit value that can be achieved by that learning method.

The correct answer rate in a case of learning by the learning method according to the present embodiment exceeds the correct answer rate in a case of learning by a conventional learning method (93.59%) for cases of compositing intermediate output of any of the layers. For example, in a case of compositing intermediate outputs output from the first convolution layer (cony 1) and inputting composite data to the second convolution layer (cony 2) and training the classification model 20, the correct answer rate is 94.39%. Also, in a case of compositing intermediate outputs output from the second convolution layer (cony 2) and inputting composite data to the first pooling layer (pool 1) and training the classification model 20, the correct answer rate is 94.38%.

In the same way, in a case of compositing intermediate outputs output from the third convolution layer (cony 3) and inputting composite data to the fourth convolution layer (cony 4) and training the classification model 20, the correct answer rate is 94.45%. Also, in a case of compositing intermediate outputs output from the fourth convolution layer (conv 4) and inputting composite data to the second pooling layer (pool 2) and training the classification model 20, the correct answer rate is 94.47%. Also, in a case of compositing intermediate outputs output from the seventh convolution layer (conv 7) and inputting composite data to the eighth convolution layer (conv 8) and training the classification model 20, the correct answer rate is 94.41%. Also, in a case of compositing intermediate outputs output from the eighth convolution layer (conv 8) and inputting composite data to the third pooling layer (pool 3) and training the classification model 20, the correct answer rate is 94.31%. Further, in a case of compositing intermediate outputs output from the first fully-connected layer (fc 1) and inputting composite data to the second fully-connected layer (fc 2) and training the classification model 20, the correct answer rate is 94.75%, which exceeds the correct answer rate in a case of learning by a conventional learning method (93.59%) by 1.16%.

Also, in a case where intermediate output is not composited, and training data or converted data where training data has been converted is composited, and the composite data is input to the input layer (input) and the classification model 20 is trained, the correct answer rate is 94.71%, which exceeds the correct answer rate in a case of learning by a conventional learning method (93.59%) by 1.12%.

It can be understood from these results that classification performance obtained in a case of compositing training data and generating composite data before input to the classification model 20, inputting the composite data to the input layer (input), and training the classification model 20, is equivalent to or above in comparison with classification performance in a case of compositing intermediate outputs of the classification model 20, inputting composite data to the subsequent stage of the configuration that has output the intermediate outputs, and training the classification model 20. The method of compositing training data and generating composite data before input to the classification model 20, inputting the composite data to the input layer (input), and training the classification model 20, does not need computation of intermediate output. The amount of computation necessary for training the classification model 20 can be reduced in comparison with the method using intermediate output of the classification model 20, and classification performance equivalent to or above the method of using intermediate output of the classification model 20 can be obtained, and thus can be said to be more effective.

Although description has been made here regarding a case of training the classification model 20 regarding classification of image data using intermediate output thereof, the method of generating composite data by compositing intermediate outputs of the classification model 20 at a predetermined ratio, inputting composite data to the subsequent stage of the configuration that has output the intermediate outputs, and training the classification model 20, can be applied to cases of training the classification model 20 regarding classification of any type of data. Also, the classification model 20 that is trained using intermediate output is not restricted to a CNN, and may be any model.

The embodiment described above is for facilitating understanding of the present invention, and is not for restrictively interpreting the present invention. The components that the embodiment is provided with, and the layout, materials, conditions, shapes and sizes, and so forth thereof are not restricted to those exemplified, and can be modified as appropriate. Also, configurations shown in different embodiments can be partially substituted for each other or combined.

For example, in a case where the initial dataset stored in the database DB is text data, composite vector data may be generated by randomly selecting two pieces of text data from the initial dataset stored in the database DB, converting each into vector data, and adding the two pieces of vector data at a predetermined ratio that has been randomly selected. The parameters of the classification model 20 may then be updated so that the classification of text data included in the composite vector data is replicated at a predetermined ratio.

According to the learning method of the present embodiment, by training the classification model 20 to replicate the ratio of classification of a plurality of pieces of text data that have been overlaid enables the classification model 20 to be trained so as to raise the precision of output of the classification model 20 as compared to a case of training the classification model 20 so as to replicate the classification of individual pieces of text data, and the classification model 20 can be trained so as to further raise the correct answer rate of classification by the classification model 20.

Also, an arrangement may be made where one piece of composite data is generated by compositing a plurality of pieces of training data of which classification has each been set, or a plurality of pieces of converted data obtained by converting the plurality of pieces of training data, at predetermined ratio r, and parameters of the classification model are updated so that a value where a predetermined ratio has been converted in accordance with a predetermined rule, is replicated by output of the classification model. That is to say, an arrangement may be made where output of the classification model is not made to accurately correspond to r, and a value where r is converted according to a predetermined rule is replicated by output of the classification model.

For example, an arrangement may be made where one piece of composite data is generated by compositing a plurality of pieces of training data of which classification has each been set, or a plurality of pieces of converted data obtained by converting the plurality of pieces of training data, at a predetermined ratio r, and parameters of the classification model are updated so that the output of the classification model is r+e (e is an amount representing noise). Specifically, in a case where first image data is an image of a car, and second image data is an image of a cat, an arrangement may be made where composite image data is generated by compositing 40% of first image data and 60% of second image data with the predetermined ratio as 0.4, noise is randomly generated at 0.01 for example, and learning processing of the classification model is performed so that the classification of the car class is 0.41 and classification of the cat class is 0.59 by the classification model. The amount of noise to be added/subtracted may be randomly changed.

Also, in a case where the predetermined ratio for compositing training data is set to r, parameters of the classification model may be updated so that classification of the plurality of pieces of training data included in the composite data is replicated at a ratio a×r (a is an optional constant) by output of the classification model. For example, in a case where first image data is an image of a car, second image data is an image of a cat, and the compositing ratio is 0.4, an arrangement may be made where composite image data is generated by compositing 40% of first image data and 60% of second image data, the constant is set to a=2, and learning processing of the classification model is performed so that the classification of the car class is 0.8 and classification of the cat class is 0.2 by the classification model.

Also, an arrangement may be made where one piece of composite data is generated by compositing a plurality of pieces of training data of which classification has each been set, or a plurality of pieces of converted data obtained by converting the plurality of pieces of training data, at predetermined ratio, and parameters of the classification model are updated so that values where the predetermined ratio is rounded up or rounded down are replicated by output of the classification model. For example, in a case where first image data is an image of a car, second image data is an image of a cat, and the predetermined ratio is 0.4, an arrangement may be made where composite image data is generated by compositing 40% of first image data and 60% of second image data, and learning processing of the classification model is performed so that classification of the car class is 0 (0.4 rounded down) and classification of the cat class is 1 (0.6 rounded up) by the classification model. That is to say, a value where the predetermined ratio is rounded off may be replicated by output of the classification model. Also, for example, in a case where first image data is an image of a car, second image data is an image of a cat, and the compositing ratio is 0.4, an arrangement may be made where composite image data is generated by compositing 40% of first image data and 60% of second image data, and learning processing of the classification model is performed so that classification of the car class is 1 (0.4 rounded up) and classification of the cat class is 1 (0.6 rounded up) by the classification model.

What is claimed is:

1. A learning method, comprising:
   execution, performed by a computer provided with at least one hardware processor and at least one memory, of
      generating one piece of composite data by compositing a plurality of pieces of training data of which classification has each been set, or a plurality of pieces of converted data obtained by converting the plurality of pieces of training data, at predetermined ratio,
      inputting one or a plurality of pieces of the composite data into a classification model, and
      updating a parameter of the classification model so that classification of the plurality of pieces of training data included in the composite data is replicated at the predetermined ratio by output of the classification model.

2. The learning method according to claim 1, further comprising:
   determining the predetermined ratio before executing generating of the composite data.

3. The learning method according to claim 2, wherein determining the predetermined ratio includes randomly selecting one numeric value from a predetermined numeric value range, and determining the predetermined ratio on the basis of the selected numeric value.

4. The learning method of claim 2, wherein determining the predetermined ratio is performed each time generating of the composite data is executed.

5. The learning method of claim 1, further comprising:
   selecting the plurality of pieces of training data from an initial dataset before executing generating of the composite data.

6. The learning method according to claim 5, wherein selecting the plurality of pieces of training data includes randomly selecting data from the initial dataset.

7. The learning method of claim 1, further comprising:
   generating the plurality of pieces of converted data by converting the plurality of pieces of training data before executing generating the composite data.

8. The learning method of claim 1, wherein
   the plurality of pieces of training data is a plurality of pieces of sound data,
   and generating the composite data includes generating one piece of composite sound data by overlaying the plurality of pieces of sound data at the predetermined ratio.

9. The learning method of claim 1, wherein
   the plurality of pieces of training data is a plurality of pieces of image data,
   and generating the composite data includes generating one piece of composite image data by adding pixel values at the predetermined ratio, for each pixel of the plurality of pieces of image data.

10. The learning method of claim 1, wherein
    the plurality of pieces of training data is a plurality of pieces of text data,
    and generating the composite data includes converting the plurality of pieces of text data into a plurality of pieces of vector data, and generating one piece of composite vector data by adding the plurality of pieces of vector data at the predetermined ratio.

11. A learning method, comprising:
    execution, by a computer provided with at least one hardware processor and at least one memory, of
       inputting a plurality of pieces of training data of which classification has each been set, or a plurality of pieces of converted data obtained by converting the plurality of pieces of training data, into a classification model, and obtaining a plurality of intermediate outputs of the classification model,
       generating one piece of composite data by compositing the plurality of intermediate outputs at a predetermined ratio,
       inputting one or a plurality of pieces of the composite data into a subsequent stage of the configuration of the classification model that has output the intermediate outputs, and
       updating a parameter of the classification model so that classification of the plurality of pieces of training data included in the composite data is replicated at the predetermined ratio by output of the classification model,
    by a computer provided with at least one hardware processor and at least one memory.

12. A non-transitory recording medium recording computer readable instructions, when executed by a computer provided with at least one hardware processor and at least one memory to execute
    generating one piece of composite data by compositing a plurality of pieces of training data of which classification has each been set, or a plurality of pieces of converted data obtained by converting the plurality of pieces of training data, at a predetermined ratio,
    inputting one or a plurality of pieces of the composite data into a classification model, and
    updating a parameter of the classification model so that classification of the plurality of pieces of training data included in the composite data is replicated at the predetermined ratio by output of the classification model.

13. A learning device, comprising:
    a generating unit that generates one piece of composite data by compositing a plurality of pieces of training data of which classification has each been set, or a plurality of pieces of converted data obtained by converting the plurality of pieces of training data, at a predetermined ratio;

an introducing unit that inputs one or a plurality of pieces of the composite data into a classification model; and an updating unit that updates a parameter of the classification model so that classification of the plurality of pieces of training data included in the composite data is replicated at the predetermined ratio by output of the classification model.

14. A learning system, comprising:

a database that stores an initial dataset of which classification has each been set;

a classification model that outputs classification of input data; and a learning device including a generating unit that generates one piece of composite data by compositing a plurality of pieces of training data selected from the initial dataset, or a plurality of pieces of converted data obtained by converting the plurality of pieces of training data, at a predetermined ratio, an introducing unit that inputs one or a plurality of pieces of the composite data into the classification model, and an updating unit that updates a parameter of the classification model so that classification of the plurality of pieces of training data included in the composite data is replicated at the predetermined ratio by output of the classification model.

* * * * *